Aug. 5, 1924.

W. G. CORSON

GROMMET

Filed March 19, 1923

1,503,985

Inventor
W. G. Corson
By Burch & Haggins
Attorney

Patented Aug. 5, 1924.

1,503,985

UNITED STATES PATENT OFFICE.

WILLIAM G. CORSON, OF AKRON, OHIO.

GROMMET.

Application filed March 19, 1923. Serial No. 626,211.

*To all whom it may concern:*

Be it known that WILLIAM G. CORSON, a citizen of the United States, residing at Akron, in the county of Summit and State of Ohio, has invented certain new and useful Improvements in Grommets, of which the following is a specification.

This invention relates to certain new and useful improvements in grommets employed for reinforcing the bead portions of pneumatic tire casings.

The primary object of the invention is to generally improve and simplify devices of the above kind.

Another object is to provide a bead reinforcing ring or grommet for pneumatic tire casings possessing both strength and durability and characterized by being laterally flexible and substantially rigid diametrically or radially, needful qualities in the proper construction of a tire casing for obtaining better service of the beads.

With the above general objects in view and others that will become apparent as the nature of the invention is better understood, the same consists in the novel form, combination and arrangement of parts hereinafter more fully described, shown in the accompanying drawing and claimed.

Figure 1:
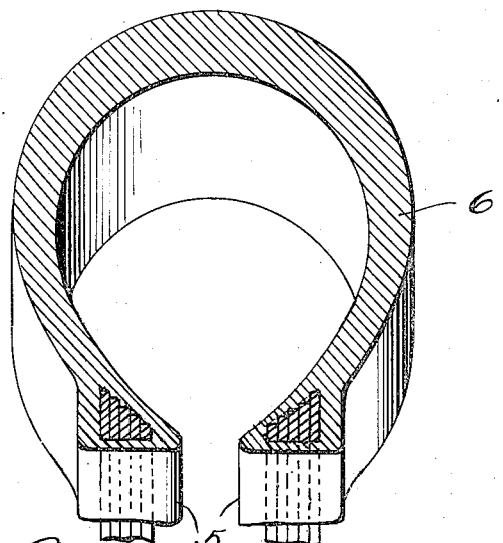
Figure 2:
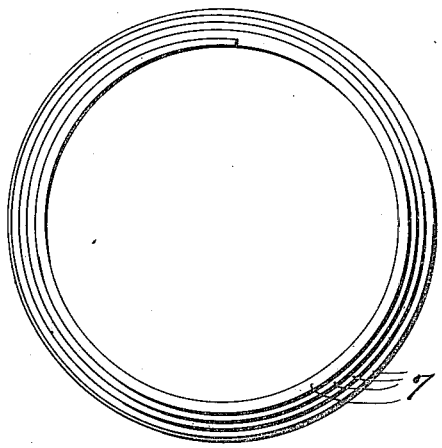
Figure 3:
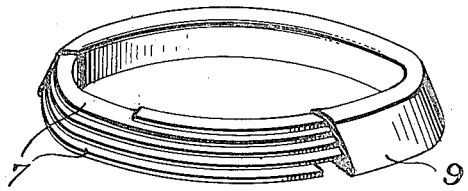
Figure 4:
Figure 5:
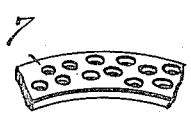
Figure 6:
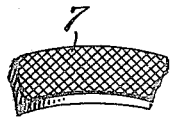
Figure 7:
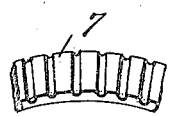
Figure 8:
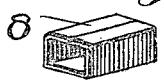

In the drawing, wherein like reference characters indicate corresponding parts throughout the several views, Fig. 1 is a fragmentary perspective view of a tire casing provided with bead reinforcing grommets or rings constructed in accordance with the present invention, Fig. 2 is a side elevational view of one of the grommets shown in Fig. 1, Fig. 3 is a perspective view, partly broken away, of the grommet shown in Fig. 2 with a covering, Fig. 4 is a central transverse section of a modified form of the invention, Fig. 5 is a fragmentary perspective view of a modified form of strip from which the grommets may be formed, Fig. 6 is a view similar to Fig. 5 of another form of strip, Fig. 7 is a view similar to Fig. 5 of still another form of strip, and Fig. 8 is a perspective view of the clamp which may be employed to hold the layers of the grommet and the ends of the latter in contiguous relation.

Referring more in detail to the several views, the present invention comprises a grommet or reinforcing ring particularly useful for the bead portions —5— of a straight-side pneumatic tire casing —6—. The invention embodies a plurality of layers —7— of sheet metal arranged in side by side contiguous relation which lie with their faces radially disposed when embedded in the bead portions of the tire casing as shown in Fig. 1, whereby the beads are made substantially rigid diametrically and are laterally flexible.

The form shown in Figs. 1 to 3 is constructed from a single continuous strip of sheet metal of spiral form with the convolutions or layers in contiguous relation and of gradually reduced width, whereby the grommet has a substantially triangular cross-sectional form as found desirable for some beads. This form of grommet may be made by placing the inner edge of the strip on the periphery of a forming core or mandrel and then winding the strip on the latter until the required number of convolutions or layers have been formed in accordance with the size of the bead.

The form of the invention shown in Fig. 4 is composed of several separate or individual layers or washer-like rings, and the spiral form may be made, as is shown with the form of Fig. 4, of layers of uniform width for producing a grommet of triangular cross-sectional form if desired.

The several layers of the grommet and their ends may be secured together by the use of solder, clamps or other fastening means. The layers are preferably fastened together by solder and clamps both, and the clamps, as at —8—, may consist of thin pieces of rolled metal wrapped about the grommet and held in place by solder. These clamps are particularly useful for holding the ends of the strip against the adjacent convolutions in the form of Figs. 1 to 3.

As shown in Fig. 5, the layers —7— may be formed of a perforated strip, or, as shown in Fig. 6, of a strip having rough surfaces.

Further, as shown in Fig. 7, the strip may be grooved.

As shown in Fig. 3, the grommets may be covered, as at —9—, with rubber or with coated or rubberized fabric or the like.

From the foregoing description, it will be seen that the present grommet may be formed of the proper shape ready to be placed in the bead portion of the tire casing without the semi-curing process which has heretofore been necessary to secure the proper shape with grommets constructed in the usual way. Also, with the layers formed of flat strips arranged with the planes of their flat faces radial it will be seen that the grommet may flex laterally, but will be substantially rigid diametrically or radially, thus insuring the desirable qualities of efficiency, durability and strength.

Minor changes may be made without departing from the spirit and scope of the invention as claimed.

What I claim is:—

1. A grommet of the class described comprising a plurality of layers of flat metal arranged in side by side contiguous relation and characterized by lateral flexibility and diametric rigidity, said grommet layers comprising a single spiral strip of sheet metal and being of gradually reduced widths, whereby the grommet has a substantially triangular cross-sectional form.

2. A grommet of the class described comprising a plurality of layers of flat metal arranged in side by side contiguous relation and characterized by lateral flexibility and diametric rigidity, said grommet layers comprising a single spiral strip of sheet metal, and means securing said layers together.

3. A grommet of the class described comprising a plurality of layers of flat metal arranged in side by side contiguous relation and characterized by lateral flexibility and diametric rigidity, said grommet layers comprising a single spiral strip of sheet metal disposed with the wide side faces of its convolutions radially disposed.

4. A grommet of the class described comprising a plurality of layers of flat metal arranged in side by side contiguous relation and characterized by lateral flexibility and diametric rigidity, said grommet layers comprising a single spiral strip of sheet metal disposed with the wide side faces of its convolutions radially disposed, and with said convolutions gradually decreasing in width, whereby the grommet has a substantially triangular cross-sectional form.

5. A grommet of the class described comprising a plurality of layers of flat metal arranged in side by side contiguous relation and characterized by lateral flexibility and diametric rigidity, said grommet layers comprising a single spiral strip of sheet metal gradually decreasing in width arranged with the wide side faces of its convolutions radially disposed, and having the maximum width of the side walls at the outer edge and the minimum width at the inner edge of the tire bead whereby said grommet has a substantially triangular cross-sectional form.

6. A grommet of the class described comprising a plurality of layers of flat metal arranged in side by side contiguous relation and characterized by lateral flexibility and diametric rigidity, said grommet layers comprising a single spiral strip of sheet metal gradually decreasing in width arranged with the wide side faces of its convolutions radially disposed, and having the maximum width of the side walls at the outer edge and the minimum width at the inner edge of the tire bead, whereby said grommet will conform to the shape of the bead of the tire.

7. A grommet of the class described comprising an integral spiral strip of sheet metal arranged with superimposed convolutions, said convolutions gradually decreasing in width and having the side walls of its convolutions radially disposed, said side walls having their maximum width at the outer edge of the tire bead and the minimum width at the inner edge thereof whereby said grommet will conform to the shape of the bead of the tire.

8. A grommet of the class described comprising an integral spiral band of superimposed convolutions gradually decreasing in width, having the maximum width of the side walls at the outer edge and the minimum width at the inner edge, whereby said grommet will conform to the shape of the bead of the tire.

9. A grommet of the class described comprising an integral spiral band arranged with superimposed convolutions, the side walls of said convolutions gradually decreasing in width radially disposed with the maximum width at the outer edge and the minimum width at the inner edge, whereby said grommet will conform to the shape of the bead of the tire.

10. A grommet comprising an integral spiral band having superimposed convolutions of decreasing width, the maximum width of the side walls being at the outer edge and the minimum width at the inner edge, said convolutions having radially disposed side walls whereby said grommet will conform to the shape of the bead of the tire.

11. A grommet comprising an integral spiral band having superimposed convolutions decreasing in width, the maximum width of the side walls being at the outer edge and the minimum width at the inner edge, said convolutions having radially disposed side walls whereby the grommet will conform to the shape of the bead of the tire, and a cover for said grommet.

12. A grommet comprising an integral spiral band arranged in superimposed convolutions decreasing in width, and having the side walls radially disposed whereby said grommet will conform to the shape of the bead of the tire.

In testimony whereof I affix my signature.

WILLIAM G. CORSON.